E. & W. HAUTALA.
TROLLING HOOK.
APPLICATION FILED MAY 16, 1911.
999,559.
Patented Aug. 1, 1911.
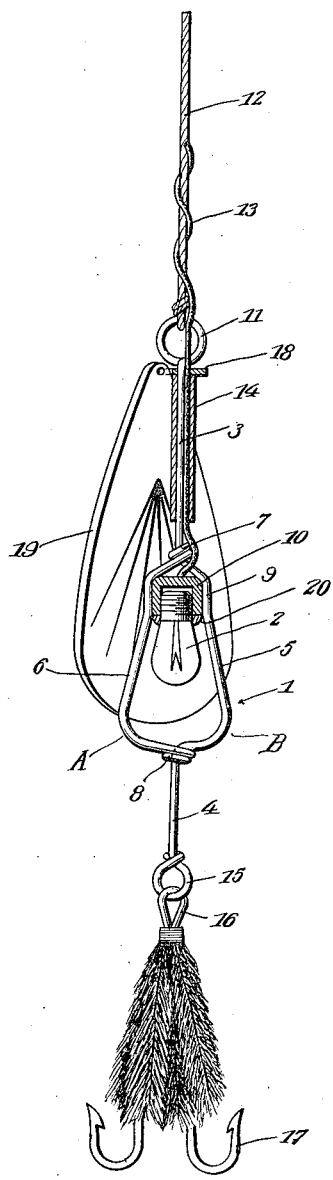
Witnesses
JH Crawford
Inventors
Emil Hautala,
Waino Hautala,
By Victor J. Evans
Attorney

UNITED STATES PATENT OFFICE.

EMIL HAUTALA AND WAINO HAUTALA, OF BRUCE CROSSING, MICHIGAN.

TROLLING-HOOK.

999,559.     Specification of Letters Patent.     Patented Aug. 1, 1911.

Application filed May 16, 1911. Serial No. 627,550.

*To all whom it may concern:*

Be it known that we, EMIL HAUTALA and WAINO HAUTALA, citizens of the United States, residing at Bruce Crossing, in the county of Ontonagon and State of Michigan, have invented new and useful Improvements in Trolling-Hooks, of which the following is a specification.

This invention relates to trolling hooks, and has for an object to provide an improved form of hook wherein an electric illumination may be used as a substitute for the usual bait.

Another object of the invention is to provide a construction of device of this character with means whereby a new electric light may be readily substituted for one in which the filament has been destroyed.

In the drawing,—the figure represents a sectional perspective view of our improved hook.

Our improved trolling hook comprises a support 1 for the incandescent electric lamp 2. The support 1 is formed preferably of wires A and B, the latter being bent to provide the upper line shank 3 and the lower hook shank 4 and an intermediate bowed portion 5. The wire A is bowed in an opposite direction from the bowed portion 5 of the wire B, as shown at 6, the upper terminal of the wire A being wrapped around the shank 3, at 7, and the lower terminal of the wire being wrapped, at 8, around the hook shank 4. The bowed portions 5 and 6 of the wires A and B are provided with parallel portions 9 to which the lamp socket 10 is secured.

An eye 11 is formed in the upper end of the line shank 3 and attached to the eye is the line 12 which has interwoven therewith or suitably wrapped therearound the conductor wires 13. These wires may be extended to a suitable battery or other electric source, (not shown). The conductor wires extend downwardly at the sides of the line shank 3, being held confined against the shank by the shank embracing and conductor wire retaining sleeve 14. The wires extend through the sleeve at the lower ends thereof and are suitably attached to the lamp socket 10. The lower end of the hook shank is provided with a loop 15 which receives the eye 16 of one or any suitable number of hooks 17. A member 18 is revolubly mounted on the line shank and disposed between the upper end of the sleeve 14 and the line eye 11. This member has operatively connected therewith the trolling spoon 19 which may be of any suitable well known construction. With a view of protecting the lamp socket against the accumulation therein of water, we preferably coat the joint between the lamp and the socket with wax 20.

We claim:

In a trolling hook of the character described, a support for an incandescent lamp, the support comprising companion wire members one of which being formed with an intermediate bowed portion and end hook and line shanks respectively, the other wire being provided with a bowed portion and having end portions secured to the hook and line shanks respectively, a lamp socket carried by the support, a lamp removably engaged with the socket, a line connected with the line shank, a sleeve embracing the line shank, conductor wires extending through the sleeve and attached to the lamp socket, a hook supported by the hook shank, and a trolley spoon confined between one end of the sleeve and the line engaging portion of the line shank.

In testimony whereof we affix our signatures in presence of two witnesses.

EMIL HAUTALA.
WAINO HAUTALA.

Witnesses:
G. A. BARNES,
ANDREW TAINAL.